United States Patent Office 2,899,164
Patented Aug. 11, 1959

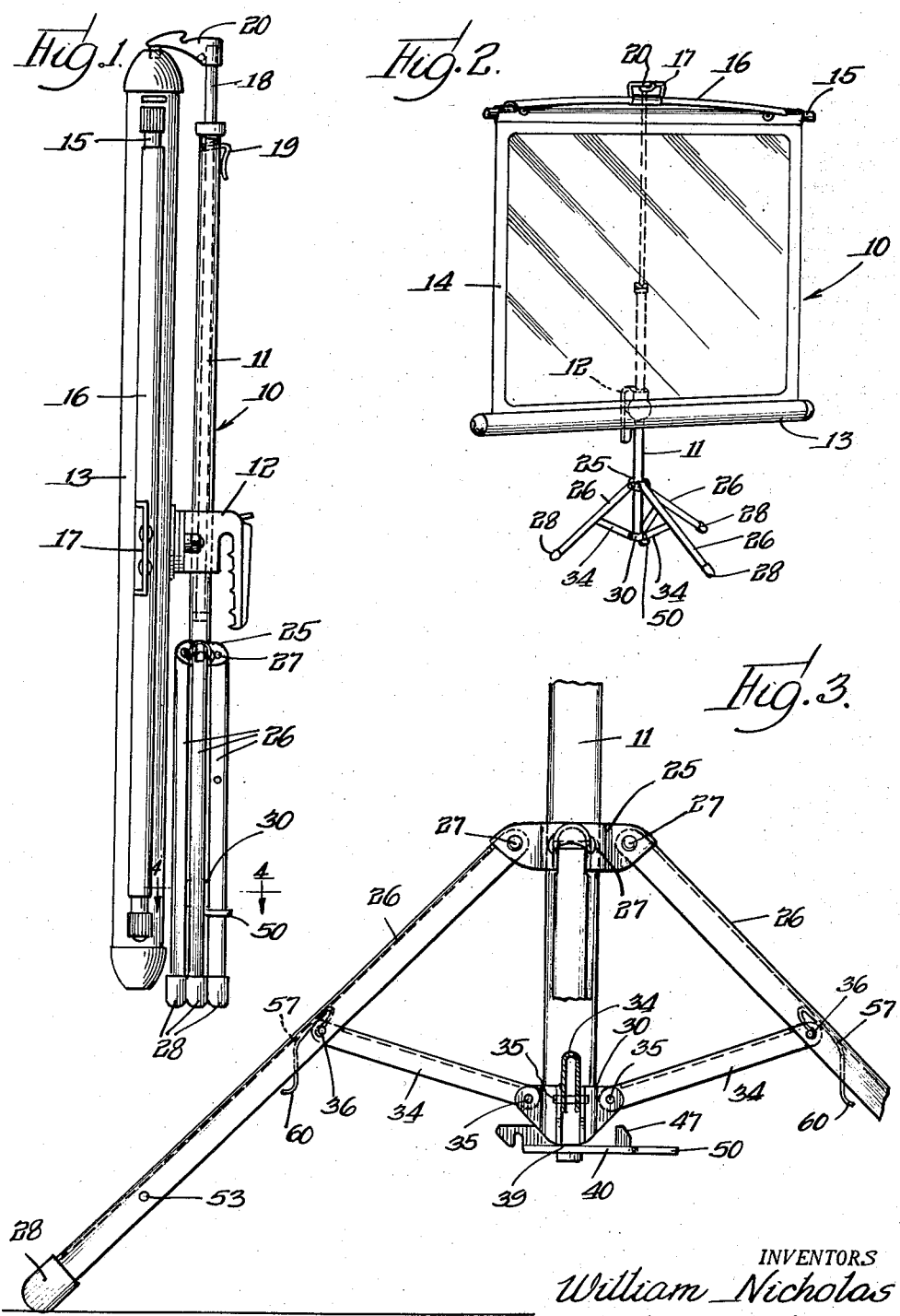

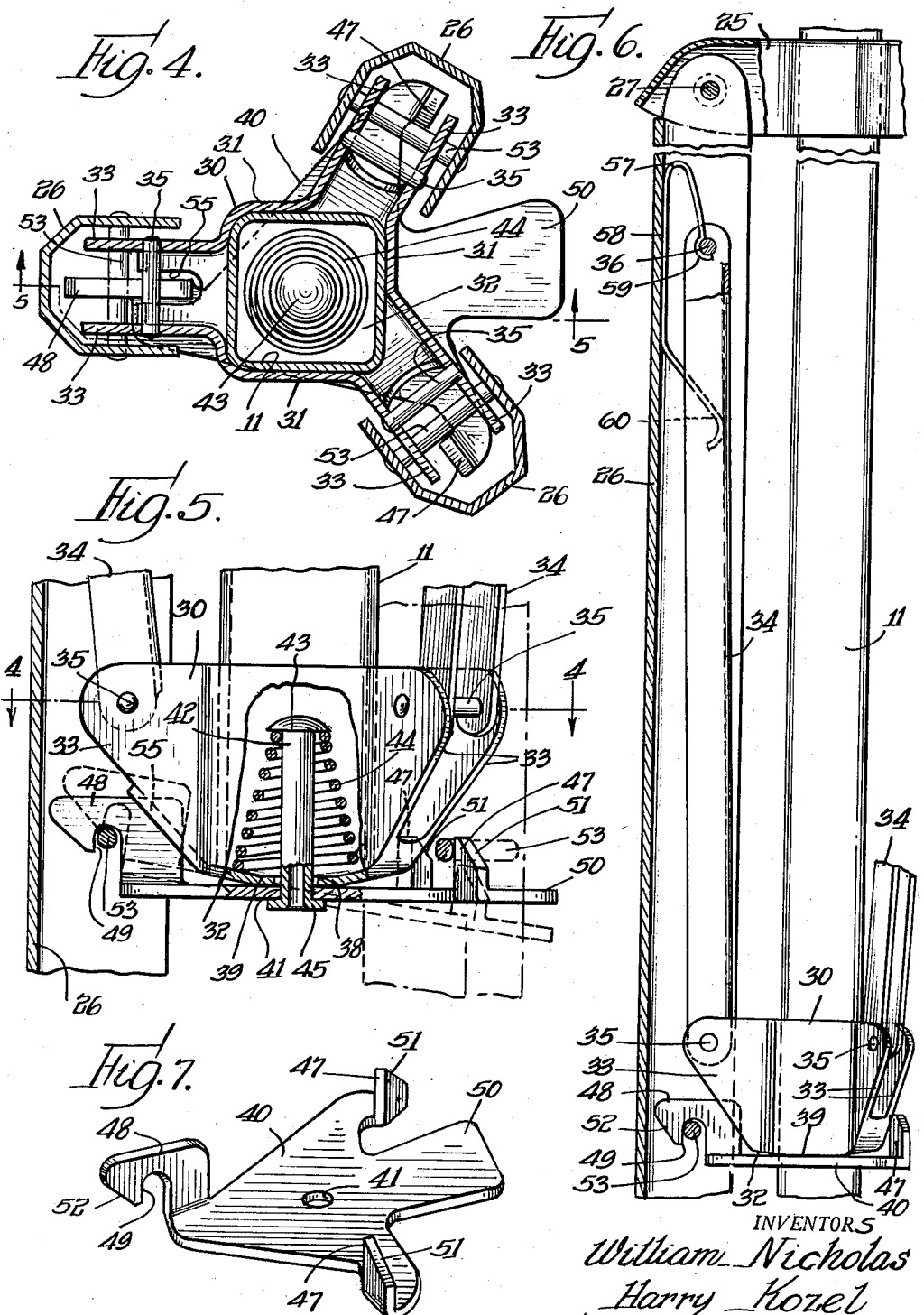

2,899,164

PORTABLE TRIPOD STAND FOR PROJECTION SCREEN

William Nicholas, Evanston, and Harry Kozel, La Grange, Ill., assignors to Radiant Manufacturing Corporation, Chicago, Ill., a corporation of Illinois Application December 16, 1954, Serial No. 475,793

10 Claims. (Cl. 248—171)

This invention is directed to a portable tripod stand for a projection screen wherein the stand includes a normally vertically arranged supporting member, a bracket fixed to the lower end of the supporting member, a bracket slidably mounted on the supporting member above the fixed bracket, three legs pivoted at their upper ends to the slidable bracket, and a link pivotally connected between the fixed bracket and each leg intermediate the ends thereof. In such a stand the legs may be swung from a collapsed position wherein the legs lie adjacent the fixed bracket and an extended position wherein the legs extend outwardly from the fixed bracket. The legs are moved to collapsed position when the stand and projection screen are to be transported or stored away and are moved to extended position for supporting the projection screen in picture exhibiting position during use.

An object of this invention is to provide such a portable tripod stand with an improved locking means for releasably locking the legs in collapsed position wherein the locking means is simple in construction, fool-proof in operation and inexpensive to manufacture and assemble, wherein binding and misalignment of the parts of the locking means are completely eliminated, and wherein the locking means is conveniently and easily operated to release the legs from their locked collapsed position and is automatically operated to lock the legs in collapsed position when moved to that position.

A further object of this invention is to provide an improved spring means for moving the legs of the stand from the collapsed position toward the extended position when the locking means is released wherein the spring means is removable and readily installed or replaced without the need for tools or the need for extraneous holding devices therefor.

Further objects of this invention reside in the details of construction of the releasable locking means and spring means and in the cooperative relationships between the component parts thereof.

Other objects and advantages of this invention will become apparent to those skilled in the art upon reference to the accompanying specification, claims and drawings in which:

Fig. 1 is an elevational view of the tripod stand and projection screen in folded and collapsed condition for transportation and storage purposes;

Fig. 2 is a perspective view of the tripod stand in supporting position and with the projection screen supported thereby in extended picture exhibiting position;

Fig. 3 is an elevational view partly in section illustrating the bottom portion of the portable tripod stand with the legs thereof in extended position;

Fig. 4 is an enlarged horizontal sectional view taken substantially along the lines 4—4 of Figs. 1 and 5 and showing the legs in collapsed position;

Fig. 5 is a vertical sectional view taken substantially along the line 5—5 of Fig. 4;

Fig. 6 is an elevational view partly in section illustrating the legs locked in collapsed position;

Fig. 7 is a perspective view of the locking plate.

Referring first to Figs. 1 and 2, the portable tripod stand and projection screen are generally designated at 10. The portable tripod stand includes a normally vertically arranged tubular supporting member 11 which slidably carries a handle member 12 which in turn may be locked in any desired position along the supporting stand 11. The handle member 12 pivotally carries a screen case 13 which in turn rotatably carries a roll upon which a projection screen 14 may be rolled and unrolled. The upper end of the projection screen 14 is provided with a suspension slat 15 which in turn is connected by a spring member 16 to a handle or bale 17. Spring means associated with the roll in the screen case 13 normally maintain the projection screen 14 within the screen case. By manipulating the handle 20 the projection screen 14 may be withdrawn from the screen case 13 as illustrated in Fig. 2. Slidably mounted within the supporting member 11 is an extension rod 18 which is clamped in any desired position by a nipping lever 19. The upper end of the extension rod 18 carries a hook member 20 which, as illustrated in Fig. 1, maintains the screen case 13 in folded condition parallel to the supporting member 11 for transportation or storage purposes and which receives the handle or bale 17 as illustrated in Fig. 2 for supporting the projection screen 14 in extended picture exhibiting position. The construction of the portable stand and the projection screen thus far described is conventional and a further description thereof is not considered necessary.

Slidably mounted on the supporting member 11 adjacent the bottom thereof is a bracket 25 provided with substantially radially extending ears. Three legs 26 are pivoted at their upper ends in the ears by means of pivot pins in the form of rivets 27. The legs 26 are channel-shaped and the open faces of the channels face toward the supporting member 11. The lower ends of the legs 26 are provided with rubber caps 28 for forming supporting feet. Secured to the bottom end of the supporting member 11 is a fixed bracket 30, this bracket having side flanges 31 engaging and secured to the supporting member 11. The fixed bracket 30 is also provided with a bottom wall 32 which overlies the end of the supporting member 11. The bracket 30 is also provided with three pairs of substantially radially extending ears 33, these ears being extensions of the side flanges 31 and the bottom wall 32. Preferably this bracket is formed by stamping and forming the same from a flat sheet of metal stock.

Located within each pair of ears 33 are the ends of links 34, the three links being pivoted to the ears by means of pivot pins in the form of rivets 35. The other ends of the links 34 are pivoted to the legs 26 intermediate the ends thereof by means of pivot pins in the form of rivets 36. By reason of this arrangement the legs 26 may be swung between a collapsed position wherein the legs lie adjacent the fixed bracket 30 as illustrated in Fig. 1 and an extended position wherein the legs 26 extend outwardly from the fixed bracket 30 as illustrated in Figs. 2 and 3. This movement of the legs between these positions is afforded by the slidable bracket 25 sliding on the supporting member 11. It is here noted that the links 34 are also channel shaped and that the open channels face away from the supporting member 11 and that the links 34 are nested within the legs 26 when the legs are in collapsed position.

The lower wall 32 of the fixed bracket 30 is provided with a central hole 38 and with a flat annular surface 39 arranged immediately about the hole. Beyond the flat annular surface 39 the bottom wall 32 tapers upwardly and merges with the ears 33. A locking plate 40 normally rests against the flat annular surface 39 and is thereby maintained in a position normal to the axis of the supporting member 11. However, the locking plate 40 is adapted to rock on the outer edge of the flat surface 39, as illustrated in dotted lines in Fig. 5. The locking plate 40 is provided with a central hole 41 which is in alignment with the hole 38 in the bottom wall of the fixed bracket 30. A double headed rivet 42 extends through the holes 38 and 41 and a coil spring 44 is interposed between one of the heads 43 and the bottom wall 32 of the fixed bracket. In mounting the locking plate 40 on the fixed bracket 30 the spring 44 is placed within the bracket 30 and the rivet 42 is passed through the coil spring 44 and the holes 38 and 41, the head 43 of the rivet engaging the coil spring 44. The lower end of the rivet 42 is then headed as indicated at 45 and the coil spring 44 then operates to resiliently hold the locking plate 40 against the flat annular surface 39 on the bottom wall of the bracket 30. As is noted in Fig. 5 the hole 38 has considerable clearance about the rivet 42 so that the locking plate 40 may be readily rocked with respect to the bracket 30. The locking plate 40 is provided with a pair of upwardly extending hooks 47 and with an ear 48 having a downwardly extending hook 49. These hooks 47 and 49 are adapted to be received within the legs 26 when the legs are moved to collapsed position. The hooks 47 are provided with upwardly and outwardly facing cams 51 and the hook 49 is provided with an outwardly and downwardly facing cam 52. The plate 40 is also provided with an outwardly extending operating projection 50 which is located between the hooks 47 and which is diametrically located with respect to the hook 49. The hooks 47 and 49 operate to receive pins 53 carried by the legs 26 when the legs are moved to collapsed position and when the locking plate 40 is in its normal position. Thus, the hooks 47 and 49 lock the legs 26 in the collapsed position. To unlock the legs the projection 50 is depressed downwardly to cause the upwardly extending hooks 47 to move downwardly away from the pins 53 and to cause the downwardly extending hook 49 to move upwardly away from the pin 53, this movement being permitted by the rocking mounting of the rocking plate 40. When this occurs, the legs 26 are unlocked and may be swung from the collapsed position to the extended position. When the legs 26 are moved from the extended position to the collapsed position, the cams 51 and 52 on the hooks are engaged by the pins 53 on the legs automatically to rock the locking plate 40 to allow the pins 53 to be received behind the hoks 47 and 49. When this occurs the locking plate 40 then assumes its normal position to securely lock the legs in the collapsed position. Since the plate 40 moves in a rocking manner for locking and unlocking legs 26, binding of the parts is substantially eliminated.

As shown more clearly in Fig. 4 the bottom wall 32 of the fixed bracket 30 is provided with a slot 55 which receives the ear 48 having the downwardly extending hook 49. This slot 55 cooperates with the ear 48 to prevent rotation of the locking plate about the axis of the supporting member 11 and in this way the hooks 47 and 49 are at all times maintained in proper position with respect to the legs 26.

Located in each leg 26 adjacent the pivot pin or rivet 36 is a substantially U-shaped spring 57 provided with a flat surface leg 58 engaging flat against the leg 26. One end of the spring 57 is provided with a return detent leg 59 which receives the pivot pin or rivet 36, this detent leg 59 and the resiliency of the spring operating to maintain the spring 57 in this position in the leg 26. The other end of the spring leg 58 is provided with an extension 60 which engages the link 34 when the legs 26 are in collapsed position as more clearly indicated in Fig. 6. These springs 57 operate to force the legs 26 outwardly when they are unlocked by manipulation of the locking plate 40 whereupon the legs 26 freely move to the extended position as illustrated in Fig. 3. By reason of the construction thereof, no extraneous securing means are required for the springs 57 and they may be mounted in place or replaced without the need for tools or the like.

While for purposes of illustration one form of this invention has been disclosed, other forms thereof may become apparent to those skilled in the art upon reference to this disclosure and, therefore, this invention is to be limited only by the scope of the appended claims.

We claim as our invention:

1. In a portable tripod stand for a projection screen having a normally vertically arranged supporting member, a bracket fixed to the lower end of the supporting member, a bracket slidably mounted on the supporting member above the fixed bracket, three legs pivoted at their upper ends to the slidable bracket, a link pivotally connected between the fixed bracket and each leg intermediate the ends thereof, whereby the legs may be swung between a collapsed position wherein the legs lie adjacent the fixed bracket and an extended position wherein the legs extend outwardly from the fixed bracket, and means for releasably locking the legs in collapsed position, the improvement wherein said locking means comprises, a pin carried by each leg adjacent the fixed bracket when the legs are in collapsed position, a locking plate, means for resiliently and rockingly mounting the locking plate on the fixed bracket with the upper face of the locking plate engaging the lower face of the fixed bracket and with the locking plate resiliently urged to a position normal to the vertical axis of the supporting member but rockable out of said normal position, a pair of upwardly facing hooks and a downwardly facing hook formed on the locking plate and receiving the pins carried by the legs when the legs are in the collapsed position and the locking plate is in said normal position for locking the legs in the collapsed position, and an outwardly extending operating projection on the locking plate between the upwardly facing hooks for rocking the locking plate out of said normal position, when the projection is downwardly depressed, to move the upwardly facing hooks downwardly and the downwardly facing hook upwardly for releasing the hooks from the pins carried by the legs to unlock the legs for movement to their extended position.

2. In a portable tripod stand for a projection screen having a normally vertically arranged supporting memmer, a bracket fixed to the lower end of the supporting member, a bracket slidably mounted on the supporting member above the fixed bracket, three legs pivoted at their upper ends to the slidable bracket, a link pivotally connected between the fixed bracket and each leg intermediate the ends thereof, whereby the legs may be swung between a collapsed position wherein the legs lie adjacent the fixed bracket and an extended position wherein the legs extend outwardly from the fixed bracket, and means for releasably locking the legs in collapsed position, the improvement wherein said locking means comprises, a pin carried by each leg adjacent the fixed bracket when the legs are in collapsed position, a locking plate, means for resiliently and rockingly mounting the locking plate on the fixed bracket with the upper face of the locking plate engaging the lower face of the fixed bracket and with the locking plate resiliently urged to a position normal to the vertical axis of the supporting member but rockable out of said normal position, a pair of upwardly facing hooks and a downwardly facing hook formed on the locking plate and receiving the pins carried by the legs when the legs are in the collapsed position and the locking plate is in said normal position for locking the legs in the collapsed position, and an outwardly extending operating projection on the locking plate between the upwardly facing hooks for rocking the locking plate out of said normal position, when the projection is downwardly depressed, to move the upwardly facing hooks downwardly and the downwardly facing hook upwardly for releasing the hooks from the pins carried by the legs to unlock the legs for movement to their extended position, said fixed bracket having a slot therein receiving the downwardly facing hook to prevent rotation of the locking plate about the vertical axis of the supporting member but to permit rocking of the locking plate into and out of said normal position.

3. In a portable tripod stand for a projection screen having a normally vertically arranged supporting member, a bracket fixed to the lower end of the supporting member, a bracket slidably mounted on the supporting member above the fixed bracket, three legs pivoted at their upper ends to the slidable bracket, a link pivotally connected between the fixed bracket and each leg intermediate the ends thereof, whereby the legs may be swung between a collapsed position wherein the legs lie adjacent the fixed bracket and an extended position wherein the legs extend outwardly from the fixed bracket, and means for releasably locking the legs in collapsed position, the improvement wherein said locking means comprises, a pin carried by each leg adjacent the fixed bracket when the legs are in collapsed position, a locking plate, means for resiliently and rockingly mounting the locking plate on the fixed bracket with the upper face of the locking plate engaging the lower face of the fixed bracket and with the locking plate resiliently urged to a position normal to the vertical axis of the supporting member but rockable out of said normal position, a pair of upwardly facing hooks and a downwardly facing hook formed on the locking plate and receiving the pins carried by the legs when the legs are in the collapsed position and the locking plate is in said normal position for locking the legs in the collapsed position, and an outwardly extending operating projection on the locking plate between the upwardly facing hooks for rocking the locking plate out of said normal position, when the projection is downwardly depressed, to move the upwardly facing hooks downwardly and the downwardly facing hook upwardly for releasing the hooks from the pins carried by the legs to unlock the legs for movement to their extended position, said hooks having outwardly facing cam surfaces engaged by the pins carried by the legs when the legs are swung toward the collapsed position for automatically rocking the locking plate out of said normal position to permit the pins to be automatically received by the hooks of the locking plate for automatically locking the legs in the collapsed position.

4. In a portable tripod stand for a projection screen having a normally vertically arranged supporting member, a bracket fixed to the lower end of the supporting member, a bracket slidably mounted on the supporting member above the fixed bracket, three legs pivoted at their upper ends to the slidable bracket, a link pivotally connected between the fixed bracket and each leg intermediate the ends thereof, whereby the legs may be swung between a collapsed position wherein the legs lie adjacent the fixed bracket and an extended position wherein the legs extend outwardly from the fixed bracket, and means for releasably locking the legs in collapsed position, the improvement wherein said locking means comprises, a pin carried by each leg adjacent the fixed bracket when the legs are in collapsed position, said fixed bracket having a hole in the bottom thereof and a flat annular surface therearound, a locking plate having a central hole, a double headed pin extending through the holes in the fixed bracket and the locking plate with one of the heads thereof engaging the lower face of the locking plate and a spring interposed between the other head of the pin and the fixed bracket for resiliently and rockingly mounting the locking plate on the fixed bracket with its upper face against the flat annular surface of the fixed bracket and with the locking plate resiliently urged to a position normal to the vertical axis of the supporting member but rockable out of said normal position, a pair of upwardly facing hooks and a downwardly facing hook formed on the locking plate and receiving the pins carried by the legs when the legs are in the collapsed position and the locking plate is in said normal position for locking the legs in the collapsed position, and an outwardly extending operating projection on the locking plate between the upwardly facing hooks for rocking the locking plate out of said normal position, when the projection is downwardly depressed, to move the upwardly facing hooks downwardly and the downwardly facing hook upwardly for releasing the hooks from the pins carried by the legs to unlock the legs for movement to their extended position.

5. In a portable tripod stand for a projection screen having a normally vertically arranged supporting member, a bracket fixed to the lower end of the supporting member, a bracket slidably mounted on the supporting member above the fixed bracket, three legs pivoted at their upper ends to the slidable bracket, a link pivotally connected between the fixed bracket and each leg intermediate the ends thereof, whereby the legs may be swung between a collapsed position wherein the legs lie adjacent the fixed bracket and an extended position wherein the legs extend outwardly from the fixed bracket, and means for releasably locking the legs in collapsed position, the improvement wherein said locking means comprises, a pin carried by each leg adjacent the fixed bracket when the legs are in collapsed position, said fixed bracket having a hole in the bottom thereof and a flat annular surface therearound, a locking plate having a central hole, a double headed pin extending through the holes in the fixed bracket and the locking plate with one of the heads thereof engaging the lower face of the locking plate and a spring interposed between the other head of the pin and the fixed bracket for resiliently and rockingly mounting the locking plate on the fixed bracket with its upper face against the flat annular surface of the fixed bracket and with the locking plate resiliently urged to a position normal to the vertical axis of the supporting member but rockable out of said normal position, a pair of upwardly facing hooks and a downwardly facing hook formed on the locking plate and receiving the pins carried by the legs when the legs are in the collapsed position and the locking plate is in said normal position for locking the legs in the collapsed position, and an outwardly extending operating projection on the locking plate between the upwardly facing hooks for rocking the locking plate out of said normal position, when the projection is downwardly depressed, to move the upwardly facing hooks downwardly and the downwardly facing hook upwardly for releasing the hooks from the pins carried by the legs to unlock the legs for movement to their extended position, said fixed bracket having a slot therein receiving the downwardly facing hook to prevent rotation of the locking plate about the vertical axis of the supporting member but to permit rocking of the locking plate into and out of said normal position.

6. In a portable tripod stand for a projection screen having a normally vertically arranged supporting member, a bracket fixed to the lower end of the supporting member, a bracket slidably mounted on the supporting member above the fixed bracket, three legs pivoted at their upper ends to the slidable bracket, a link pivotally connected between the fixed bracket and each leg intermediate the ends thereof, whereby the legs may be swung between a collapsed position wherein the legs lie adjacent the fixed bracket and an extended position wherein the legs extend outwardly from the fixed bracket, and means for releasably locking the legs in collapsed position, the improvement wherein said locking means comprises, a pin carried by each leg adjacent the fixed bracket when the legs are in collapsed position, said fixed bracket having a hole in the bottom thereof and a flat annular surface therearound, a locking plate having a central hole, a double headed pin extending through the holes in the fixed bracket and the locking plate with one of the heads thereof engaging the lower face of the locking plate and a spring interposed between the other head of the pin and the fixed bracket for resiliently and rockingly mounting the locking plate on the fixed bracket with its upper face against the flat annular surface of the fixed bracket and with the locking plate resiliently urged to a position normal to the vertical axis of the supporting member but rockable out of said normal position, a pair of upwardly facing hooks and a downwardly facing hook formed on the locking plate and receiving the pins carried by the legs when the legs are in the collapsed position and the locking plate is in said normal position for locking the legs in the collapsed position, and an outwardly extending operating projection on the locking plate between the upwardly facing hooks for rocking the locking plate out of said normal position, when the projection is downwardly depressed, to move the upwardly facing hooks downwardly and the downwardly facing hook upwardly for releasing the hooks from the pins carried by the legs to unlock the legs for movement to their extended position, said hooks having outwardly facing cam surfaces engaged by the pins carried by the legs when the legs are swung toward the collapsed position for automatically rocking the locking plate out of said normal position to permit the pins to be automatically received by the hooks of the locking plate for automatically locking the legs in the collapsed position.

7. In a portable tripod stand for a projection screen having a normally vertically arranged supporting member, a bracket fixed to the lower end of the supporting member, a bracket slidably mounted on the supporting member above the fixed bracket, three legs pivoted at their upper ends to the slidable bracket, a link pivotally connected between the fixed bracket and each leg intermediate the ends thereof, whereby the legs may be swung between a collapsed position wherein the legs lie adjacent the fixed bracket and an extended position wherein the legs extend outwardly from the fixed bracket, and means for releasably locking the legs in collapsed position, the improvement wherein said locking means comprises, a pin carried by each leg adjacent the fixed bracket when the legs are in collapsed position, a locking plate, means for resiliently and rockingly mounting the locking plate on the fixed bracket with the upper face of the locking plate engaging the lower face of the fixed bracket and with the locking plate resiliently urged to a position normal to the vertical axis of the supporting member but rockable out of said normal position, a pair of upwardly facing hooks and a downwardly facing hook formed on the locking plate and receiving the pins carried by the legs when the legs are in the collapsed position and the locking plate is in said normal position for locking the legs in the collapsed position, and an outwardly extending operating projection on the locking plate between the upwardly facing hooks for rocking the locking plate out of said normal position, when the projection is downwardly depressed, to move the upwardly facing hooks downwardly and the downwardly facing hook upwardly for releasing the hooks from the pins carried by the legs to unlock the legs for movement to their extended position, said hooks having outwardly facing cam surfaces engaged by the pins carried by the legs when the legs are swung toward the collapsed position for automatically rocking the locking plate out of said normal position to permit the pins to be automatically received by the hooks of the locking plate for automatically locking the legs in the collapsed position, said fixed bracket having a slot therein receiving the downwardly facing hook to prevent rotation of the locking plate about the vertical axis of the supporting member but to permit rocking of the locking plate into and out of said normal position.

8. In a portable tripod stand for a projection screen having a normally vertically arranged supporting member, a bracket fixed to the lower end of the supporting member, a bracket slidably mounted on the supporting member above the fixed bracket, three legs pivoted at their upper ends to the slidable bracket, a link pivotally connected between the fixed bracket and each leg intermediate the ends thereof, whereby the legs may be swung between a collapsed position wherein the legs lie adjacent the fixed bracket and an extended position wherein the legs extend outwardly from the fixed bracket, and means for releasably locking the legs in collapsed position, the improvement wherein said locking means comprises, a pin carried by each leg adjacent the fixed bracket when the legs are in collapsed position, said fixed bracket having a hole in the bottom thereof and a flat annular surface therearound, a locking plate having a central hole, a double headed pin extending through the holes in the fixed bracket and the locking plate with one of the heads thereof engaging the lower face of the locking plate and a spring interposed between the other head of the pin and the fixed bracket for resiliently and rockingly mounting the locking plate on the fixed bracket with its upper face against the flat annular surface of the fixed bracket and with the locking plate resiliently urged to a position normal to the vertical axis of the supporting member but rockable out of said normal position, a pair of upwardly facing hooks and a downwardly facing hook formed on the locking plate and receiving the pins carried by the legs when the legs are in the collapsed position and the locking plate is in said normal position for locking the legs in the collapsed position, and an outwardly extending operating projection on the locking plate between the upwardly facing hooks for rocking the locking plate out of said normal position, when the projection is downwardly depressed, to move the upwardly facing hooks downwardly and the downwardly facing hook upwardly for releasing the hooks from the pins carried by the legs to unlock the legs for movement to their extended position, said hooks having outwardly facing cam surfaces engaged by the pins carried by the legs when the legs are swung toward the collapsed position for automatically rocking the locking plate out of said normal position to permit the pins to be automatically received by the hooks of the locking plate for automatically locking the legs in the collapsed position, said fixed bracket having a slot therein receiving the downwardly facing hook to prevent rotation of the locking plate about the vertical axis of the supporting member but to permit rocking of the locking plate into and out of said normal position.

9. In a portable tripod stand for a projection screen having a normally vertically arranged supporting member, a bracket fixed to the lower end of the supporting member, a bracket slidably mounted on the supporting member above the fixed bracket, three legs pivoted at their upper ends to the slidable bracket, a link pivotally connected between the fixed bracket and each leg intermediate the ends thereof, whereby the legs may be swung between a collapsed position wherein the legs lie adjacent the fixed bracket and an extended position wherein the legs extend outwardly from the fixed bracket, and means for releasably locking the legs in collapsed position, the improvement wherein the legs comprise inwardly facing channels, the links comprise outwardly facing channels nesting in the legs when the legs are in collapsed position, and the pivotal connection between each leg and link comprises a rivet, and including a substantially U-shaped spring removably associated with each pivotal connection between the legs and links, each U-shaped spring having a flat leg portion engaging flat against the inner channel surface of the leg, a return detent leg portion at one end of the flat leg portion engaging the rivet for removably maintaining the spring in place in the leg, and an extension at the other end of the flat leg portion resiliently pressing against the inner channel surface of the link for automatically moving the legs from the collapsed position to the extended position when the releasable locking means is operated to release the legs from collapsed position.

10. In a portable tripod stand for a projection screen having a normally vertically arranged supporting member, a bracket fixed to the lower end of the supporting member, a bracket slidably mounted on the supporting member above the fixed bracket, three legs pivoted at their upper ends to the slidable bracket, a link pivotally connected between the fixed bracket and each leg intermediate the ends thereof, whereby the legs may be swung between a collapsed position wherein the legs lie adjacent the fixed bracket and an extended position wherein the legs extend outwardly from the fixed bracket, and means for releasably locking the legs in collapsed position, the improvement wherein the legs comprise inwardly facing channels, the links comprise outwardly facing channels nesting in the legs when the legs are in collapsed position, and the pivotal connection between each leg and link comprises a rivet, and including a substantially U-shaped spring removably associated with each pivotal connection between the legs and links, each U-shaped spring having a flat leg portion engaging flat against the inner channel surface of the leg, a return detent leg portion at one end of the flat leg portion engaging the rivet for removably maintaining the spring in place in the leg, and an extension at the other end of the flat leg portion resiliently pressing against the inner channel surface of the link for automatically moving the legs from the collapsed position to the extended position when the releasable locking means is operated to release the legs from collapsed position, and wherein the locking means comprises, a pin carried by each leg adjacent the fixed bracket when the legs are in collapsed position, a locking plate, means for resiliently and rockingly mounting the locking plate on the fixed bracket with the upper face of the locking plate engaging the lower face of the fixed bracket and with the locking plate resiliently urged to a position normal to the vertical axis of the supporting member but rockable out of said normal position, a pair of upwardly facing hooks and a downwardly facing hook formed on the locking plate and receiving the pins carried by the legs when the legs are in the collapsed position and the locking plate is in said normal position for locking the legs in the collapsed position, and an outwardly extending operating projection on the locking plate between the upwardly facing hooks for rocking the locking plate out of said normal position, when the projection is downwardly depressed, to move the upwardly facing hooks downwardly and the downwardly facing hook upwardly for releasing the hooks from the pins carried by the legs to unlock the legs for movement to their extended position.

References Cited in the file of this patent
UNITED STATES PATENTS

| | | |
|---|---|---|
| 383,535 | MacPherson | May 29, 1888 |
| 2,472,474 | Gash | June 7, 1949 |
| 2,591,244 | Du Mais et al. | Apr. 1, 1952 |
| 2,659,559 | Du Mais | Nov. 17, 1953 |
| 2,708,559 | Du Mais | May 17, 1955 |